US012746884B2

(12) United States Patent
Rios et al.

(10) Patent No.: US 12,746,884 B2
(45) Date of Patent: Sep. 29, 2026

(54) EMERGENCY RELEASE SYSTEM FOR PUBLIC SAFETY VEHICLE SECURITY PARTITION

(71) Applicant: Westin Automotive Products, Inc., San Dimas, CA (US)

(72) Inventors: Carlos Rios, Mira Loma, CA (US); Jose Eduardo Lopez Moctezuma, La Mirada, CA (US); Jeremy Lanini, Minden, NV (US)

(73) Assignee: Westin Automotive Products, Inc., San Dimas, CA (US)

( * ) Notice: Subject to any disclaimer, the term of this patent is extended or adjusted under 35 U.S.C. 154(b) by 273 days.

(21) Appl. No.: 18/659,112

(22) Filed: May 9, 2024

(65) Prior Publication Data

US 2024/0425009 A1 Dec. 26, 2024

Related U.S. Application Data

(60) Provisional application No. 63/522,491, filed on Jun. 22, 2023.

(51) Int. Cl.
*B60R 21/12* (2006.01)

(52) U.S. Cl.
CPC .................................. *B60R 21/12* (2013.01)

(58) Field of Classification Search
CPC .......... B60R 21/12; B60R 21/026; B60N 2/91
See application file for complete search history.

(56) References Cited

U.S. PATENT DOCUMENTS

2011/0156420 A1* 6/2011 Yasui .................. B60N 2/7011 296/183.1
2017/0327070 A1* 11/2017 Schmidt .................. B60R 21/12
2022/0281400 A1* 9/2022 Bornais .................. B60R 21/12

* cited by examiner

*Primary Examiner* — Nicholas McFall
*Assistant Examiner* — Eric Acosta
(74) *Attorney, Agent, or Firm* — Jenny Lee

(57) ABSTRACT

The present invention provides a security partition having a quick release emergency release system for a vehicle comprising: a partition frame attached to a front partition panel and a release partition panel having a release partition pin interface, partition locking interfaces, and an emergency panel system having a panel, at least one handles, panel locking means, and quick release locking means; wherein in emergency conditions, the panel locking means and the quick release locking means are activated to quickly disengage the panel from the release partition to provide an emergency exit for the secured occupant area of the vehicle.

9 Claims, 20 Drawing Sheets

EMERGENCY RELEASE SYSTEM FOR PUBLIC SAFETY VEHICLE SECURITY PARTITION

FIELD OF INVENTION

The present invention relates to the vehicle accessory field. More specifically, it relates to an emergency release system for security partition for use in vehicles, especially for public safety vehicles.

BACKGROUND OF INVENTION

Referring to FIGS. 1-2, many public vehicles (10), especially taxis and police cars use a security partition 12 to form a physical barrier between the unsecured occupant area 14 and the secured occupant area 16 in order to prevent access to the unsecured occupant area 14 from the secured occupant area 16. A conventional security partition 12 basically includes partition panels (18, 24) that are attached (e.g., welded or bolted) to a partition frame 20 attached to the interior 22 of a vehicle (10). For safety reasons, it is important to provide an emergency escape for the occupant (s) in the secured occupant area 16 in emergency conditions. When dealing with emergency conditions, it is desirable that the emergency exit can be quickly and easily activated. However, it is equally important that during normal conditions, the emergency exit is secured (i.e., cannot be activated from the secured occupant area 16). The present invention provides an emergency release system 100 of a security partition that quickly and efficiently provides such emergency exit while still maintaining the desired secured partition of the secured occupant area 16 during normal conditions.

BRIEF DESCRIPTION OF THE DRAWING

The present invention will be more clearly understood when considering the accompanying drawing of which.

DESCRIPTION OF THE PREFERRED EMBODIMENT

Figure 1:
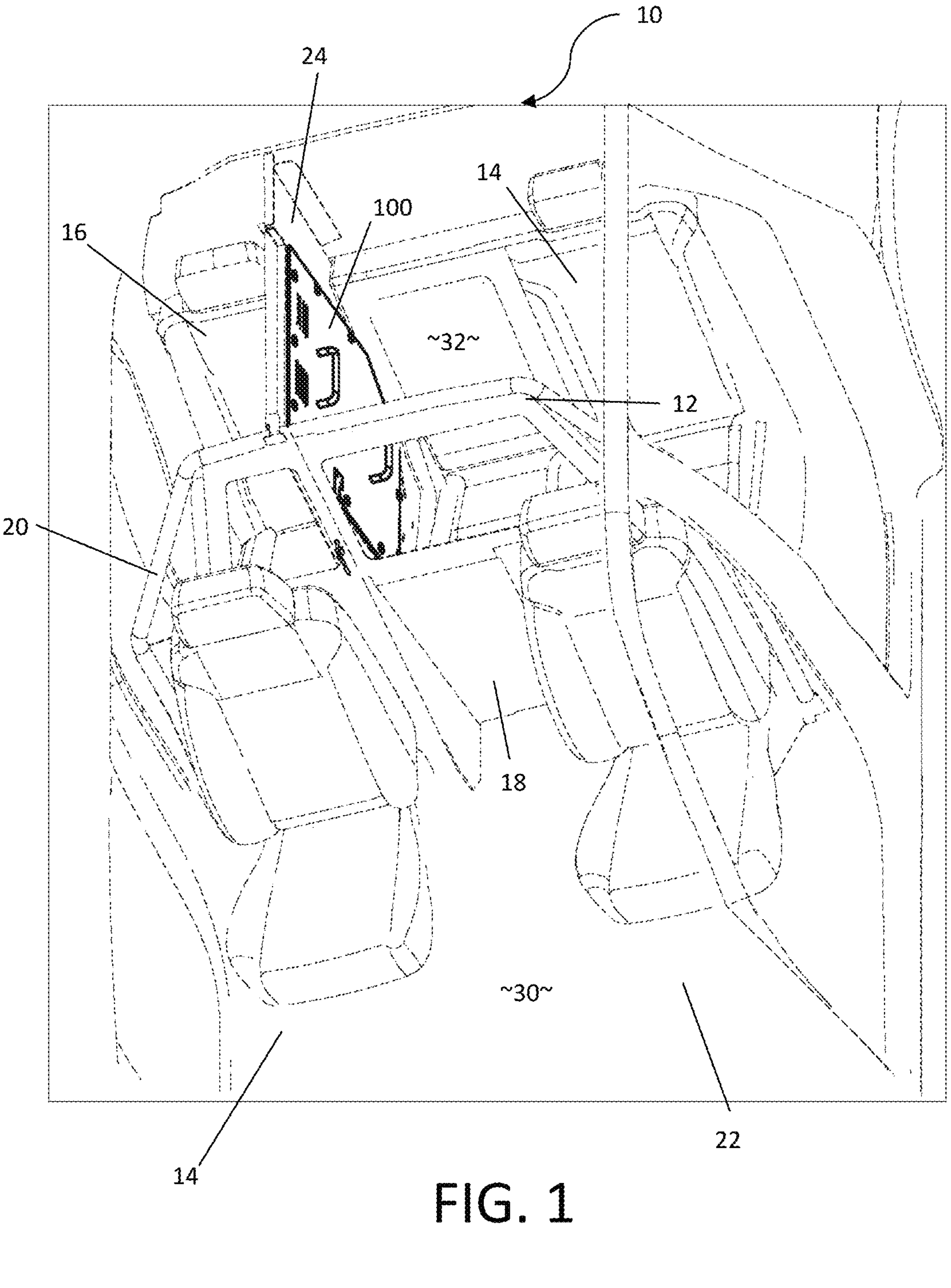
FIG. 1 shows a top perspective cross-sectional view of a portion of a public vehicle having a security partition that includes an emergency release system in accordance with the principals of the present invention.
Figure 2:
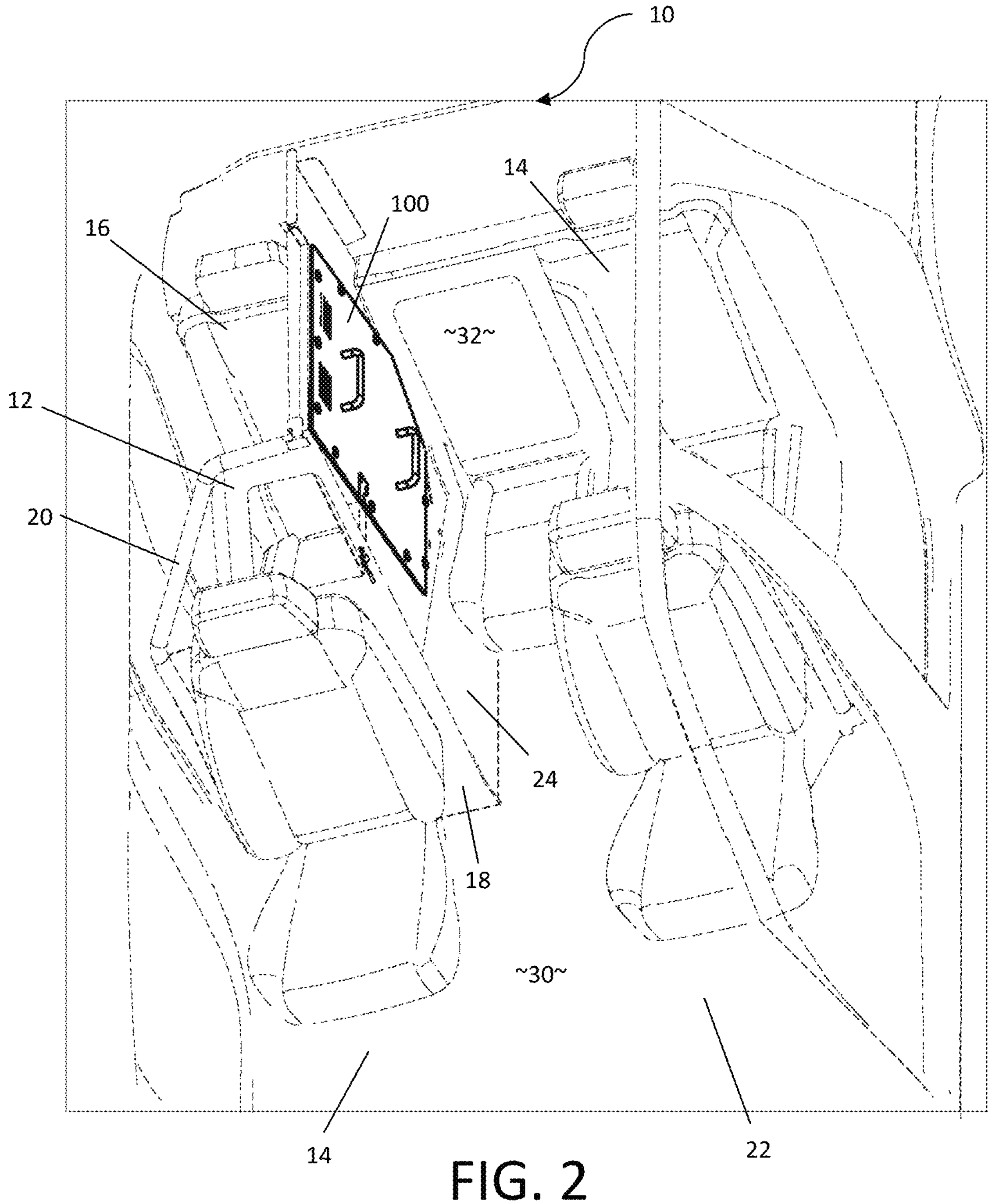
FIG. 2 shows a top perspective cross-sectional view of a portion of another embodiment of the security partition that includes an emergency release system in accordance with the principals of the present invention.

Referring to FIGS. 1-9, the present invention provides an emergency release system 100 that is incorporated into a security partition 12 for use in vehicles 10 (especially public safety vehicles). The security partition 12 can be any art-disclosed security partition adapted to be installed into interior 22 of a vehicle 10. The security partition 12 includes a partition frame 20 attached to one or more front partition panel(s) 18 and a release partition panel 24. These panels (18, 24) form a barrier separating the secured occupant area 16 from the unsecured occupant area 14 as shown in FIGS. 1-2. These panels (18, 24) can be constructed using any suitable art-disclosed materials such as metal, plastic (e.g., polycarbonate or the like), and a combination thereof. The front partition panel 18 is installed between the front occupant area 30 and the rear occupant area 32. The release partition panel 24 is installed in the rear occupant area 32 and dividing the rear occupant area 32 into the secured occupant area 16 and the unsecured occupant area 14. The secured occupant area 16 can be located either behind the front right (e.g., passenger) seat as shown in FIGS. 1-2 or behind the front left (e.g., driver) seat (not shown). Moreover, the present invention includes having the partition frame 20 either expanding the entire width of the interior 22 of the vehicle 10 (as shown in FIG. 1) or a portion of the width of the interior 22 of the vehicle 10 (as shown in FIG. 2). Furthermore, it is optional for the security partition 12 to also provide a barrier separating the unsecured occupant area 14 between the front occupant area 30 and the rear occupant area 32 utilizing additional partition panel(s) 18 as shown in FIG. 1. Alternatively, as shown in FIG. 2, the present invention includes no separation of the unsecured occupant area 16 between the front occupant area 30 and the rear occupant area 32 by the security partition 12.

Referring to FIGS. 1-9, the emergency release system 100 comprises a panel 36, the panel locking means 38, at least one handle 40, the quick release locking means 28, and the partition locking interfaces 26. In one exemplary embodiment of the system 100, the panel 36 includes panel locking interfaces (e.g., through holes or the like) 42 that provides access for insert portion 29 of the quick release locking means 28 to engage with each of the partition locking interfaces 26 of the release partition panel 24 (as shown in FIGS. 3A-C and 5A) to either secure the panel 36 in normal conditions or quickly releases the panel 36 in emergency conditions.

Figure 3:
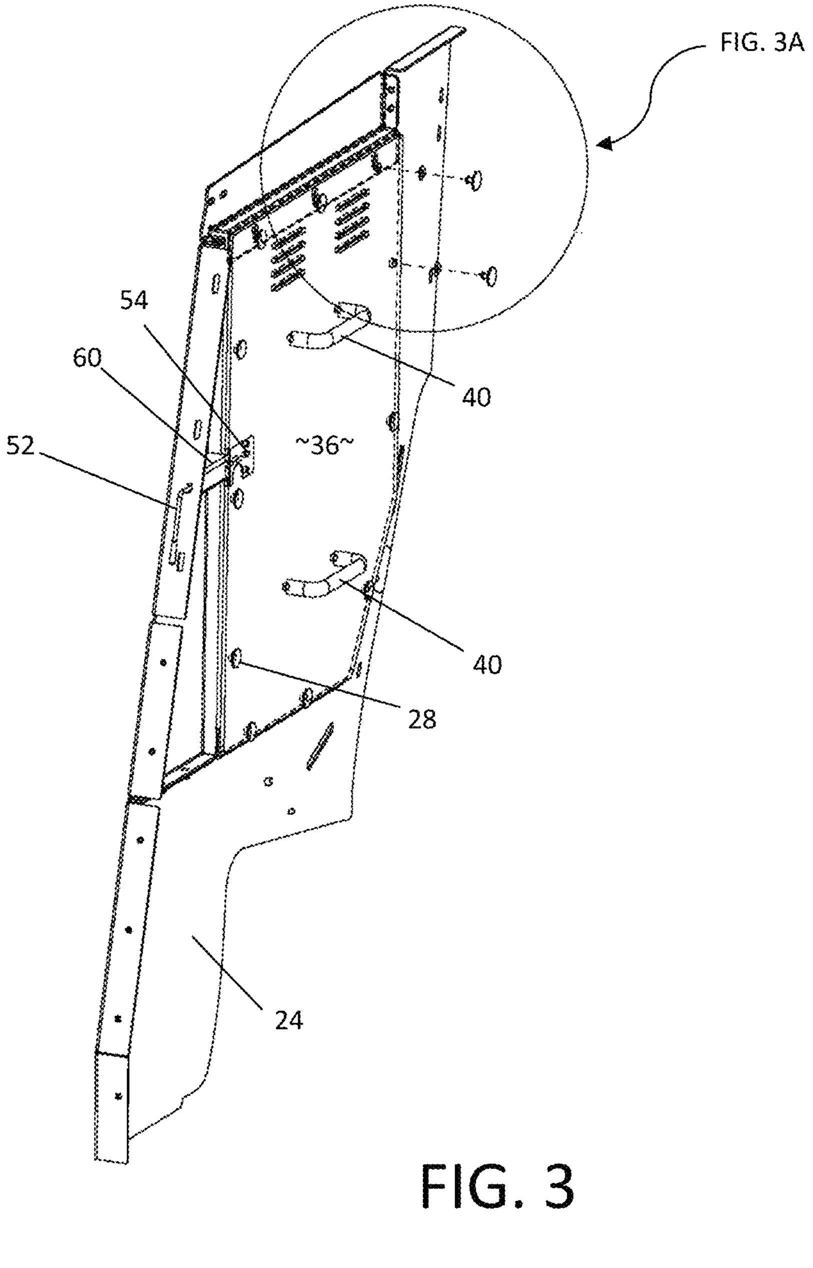
FIG. 3 shows a perspective front side view of a release partition panel of the security partition shown in FIGS. 1-2.
Figure 3A:
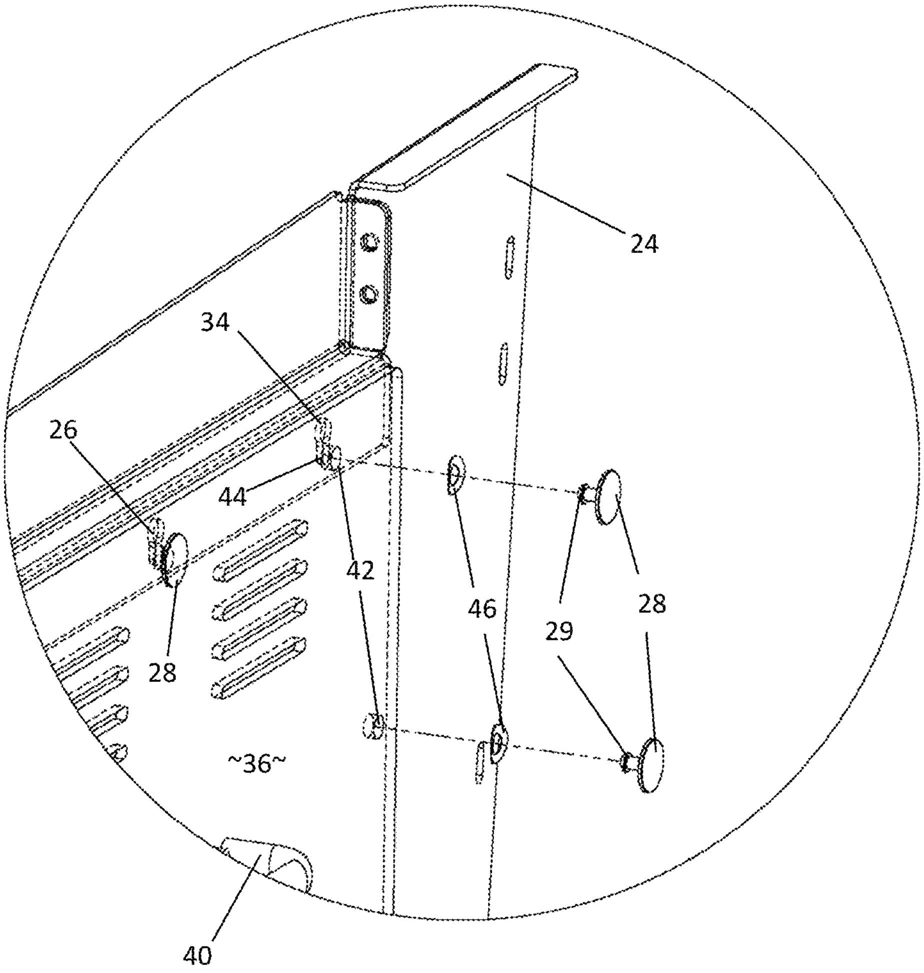
FIG. 3A shows a close-up perspective side view of a section of the release partition panel shown in FIG. 3 with one embodiment of the quick release locking means of the emergency release system.
Figure 3B:
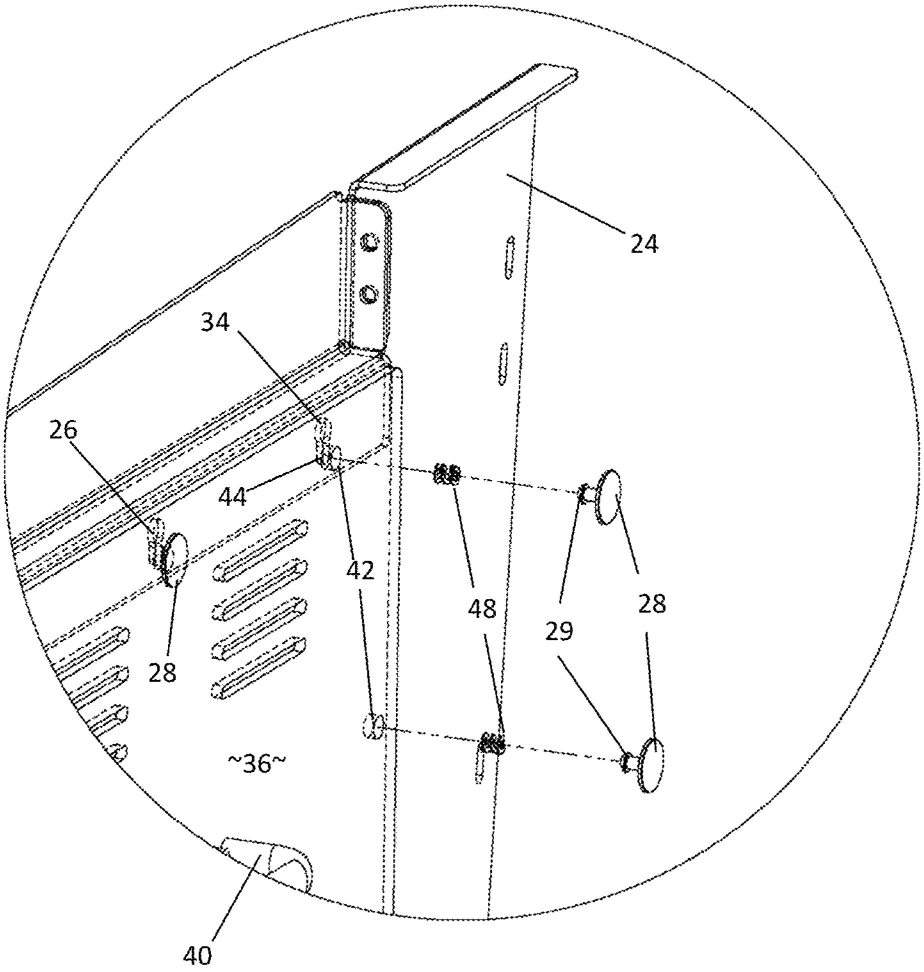
FIG. 3B-3C each shows the same close-up perspective side view of the section of the release partition panel shown in FIG. 3A but with a different embodiment of the quick release locking means of the emergency release system.
Figure 3C:
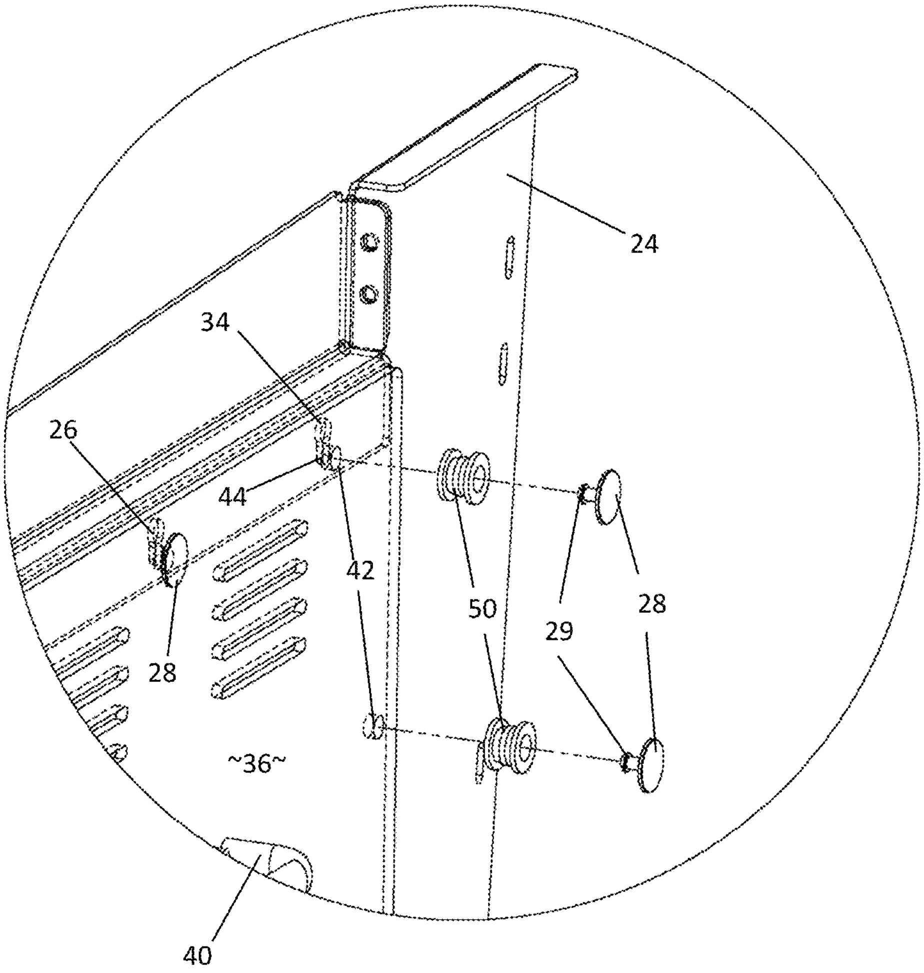

In this embodiment, the quick release locking means 28 are locking pins each having hourglass in shape and the insert portion 29 so they can fit securely their corresponding partition locking interfaces 26 (e.g., keyhole slots or the like) cut into the release partition panel 24 as shown in FIGS. 3A-C and 6-7. As shown in these figures, in one exemplary embodiment, each of the partition locking interfaces 26 is a keyhole slot having a release slot portion 34 and a secured slot portion 44. The quick release locking means 28 (e.g., locking pins) are securely engaged with the partition locking interfaces 26 when the insert portion 29 of the quick release locking means 28 are engaged in the secured slot portion 44 of the partition locking interfaces 26. The configuration of the quick release locking means 28 in conjunction with the panel locking means 38 and the partition locking interfaces 26 restrains the panel 36 in all directions except vertically. Each of the quick release locking means 28 may optionally further include a conventional anti-rattle means such as a washer (e.g., a spring washer or the like) 46 (as shown in FIG. 3A), a spring 48 (as shown in FIG. 3B), a compressor 50 (as shown in FIG. 3C) constructed out of rubber or elastic polymer, or the like, to prevent the quick release locking means 28 (e.g., the locking pins) from rattling loose while the vehicle 10 travels on rough roads. Any art-disclosed elastic polymers (e.g., nitrile, polyurethane, Buna-N, etc.) suitable for use as a compressor is included in the present invention. Other art-disclosed anti-rattle means that can also be used includes, but is not limited to, (i) weather stripping around either the panel 36 or the portion of the release partition 24 that has contact with the panel 36; and (ii) bent spring steel on the edges of either the panel 36 or the portion of the release partition 24 that has contact with the panel 36.

When each of the quick release locking means 28 is moved to the release slot portion 33 of the partition locking interfaces 26, the quick release locking means 28 and the panel 36 are released from their engagement with the partition locking interfaces 26.

The at least one handle 40 as shown in FIGS. 1-5 can also be any other art-disclosed handle or feature/component that allows an user to grab and pull the panel 36 (e.g., apertures allowing the user's fingers to grab and pull the panel 36). Accordingly, the term "handle" 40 is hereinafter defined to also include any such art-disclosed grab feature/components.

Figures 10, 10A:
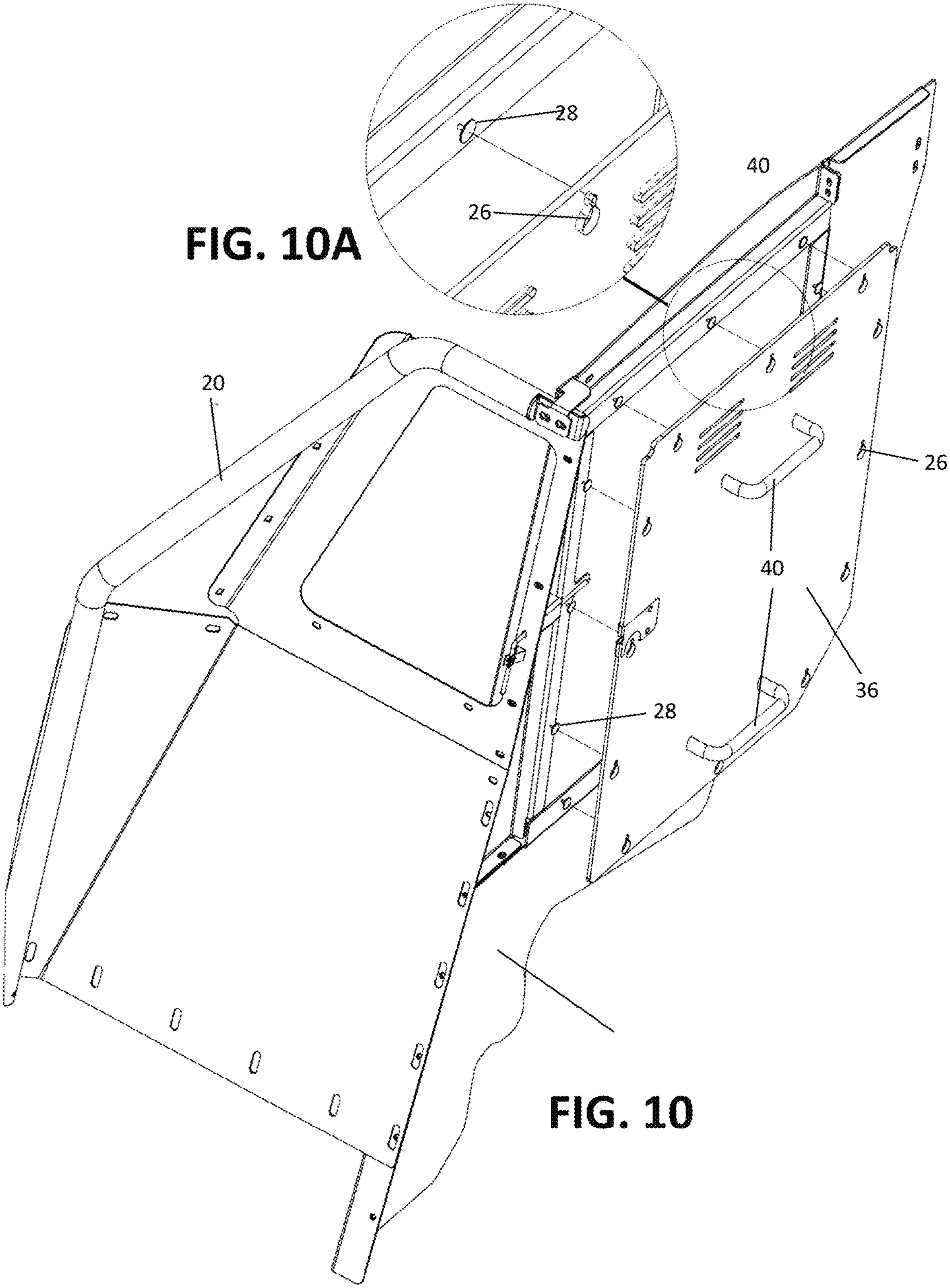
FIG. 10 shows a perspective side view of the portion of the security partition shown in FIG. 2 but with another embodiment of the emergency release system.
FIG. 10A shows a close-up perspective view of a portion of FIG. 10.

Alternatively, as shown in FIGS. 10 and 10A, the locations of the partition locking interfaces 26 and the quick release locking means 28 described above (e.g., locking pins) are switched in that each of the quick release locking means 28 is fixedly attached (e.g., welded) to the release partition panel 24 while the partition locking interfaces 26 are now cut into the panel 36. The quick release locking means 28 and the partition locking interface 26 are still engaged and disengaged in the same fashion as described above. In this alternative embodiment, since the quick release locking means are fixedly attached to the release partition pane 24, there is no longer a need for the panel locking interfaces 42.

Figure 4:
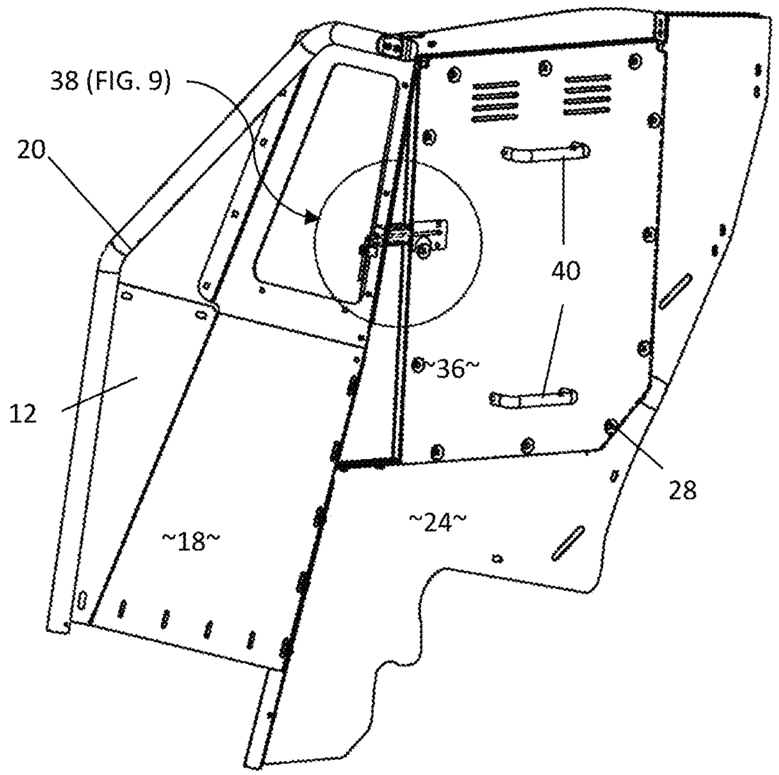
FIG. 4 shows a perspective side view of the portion of the security partition shown in FIG. 2.
Figure 5A:
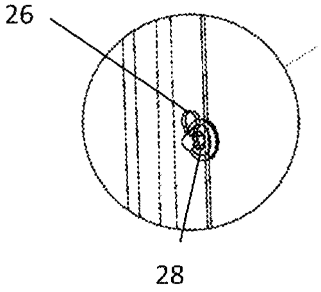
FIG. 5A shows a close-up perspective view of the locking means shown in FIG. 5.
Figure 5:
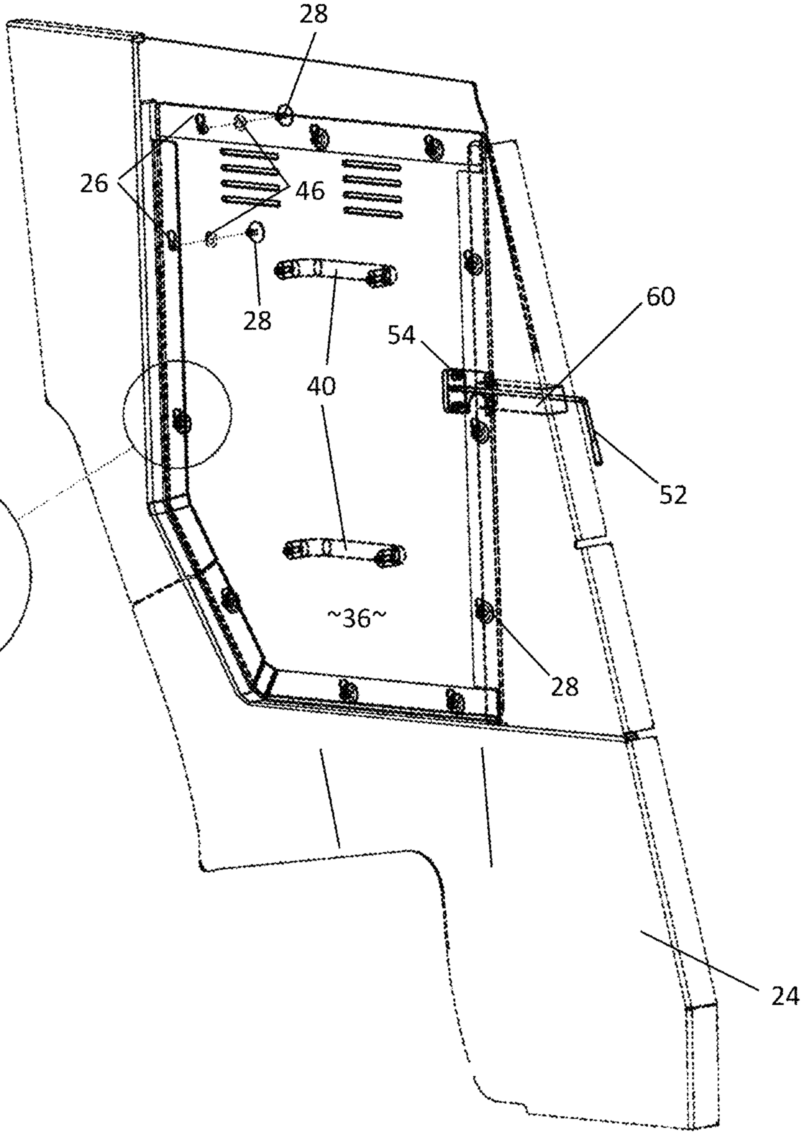
FIG. 5 shows a perspective back view of the release partition panel shown in FIG. 3.
Figure 6:
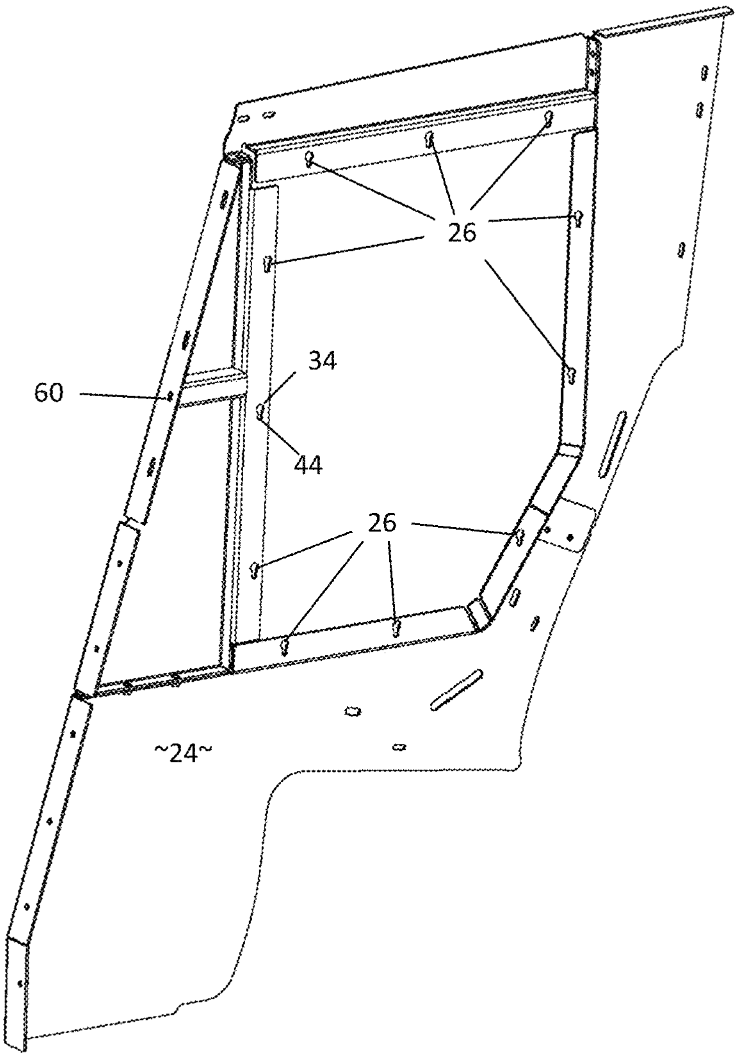
FIG. 6 shows a perspective front view of the release partition panel shown in FIG. 5 without the panel assembly installed.
Figure 7:
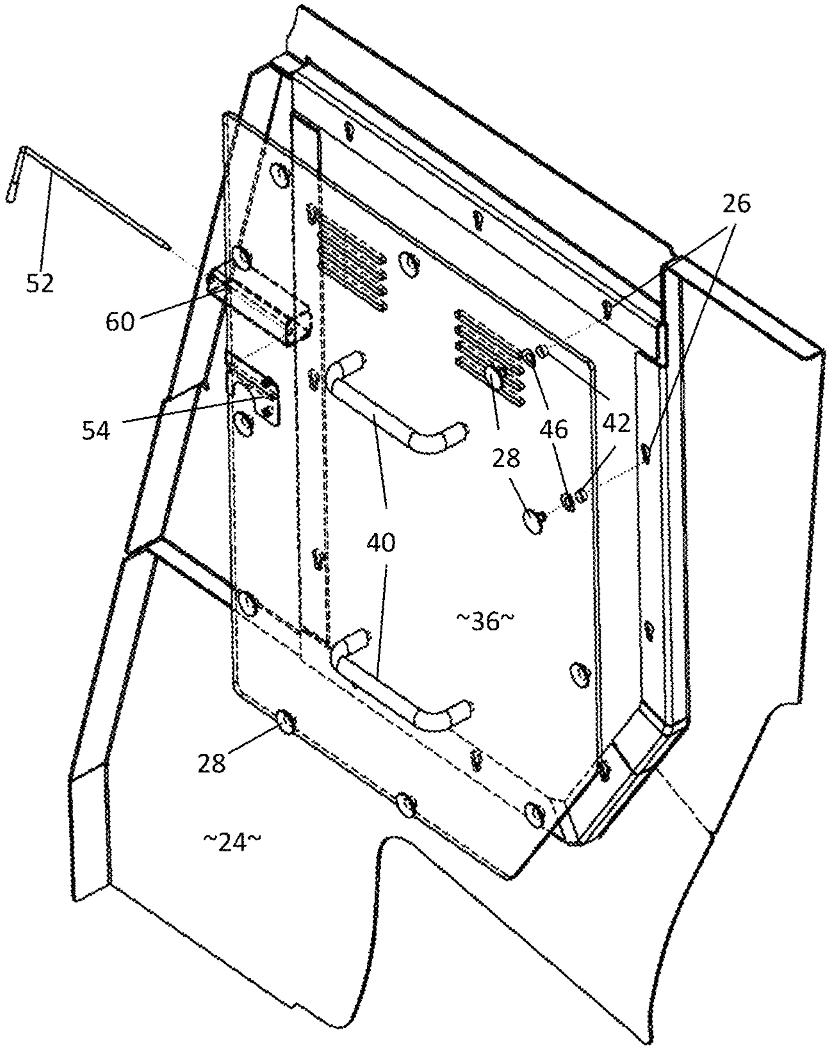
FIG. 7 shows an exploded perspective front side view of the release partition panel shown in FIG. 3.
Figure 8:
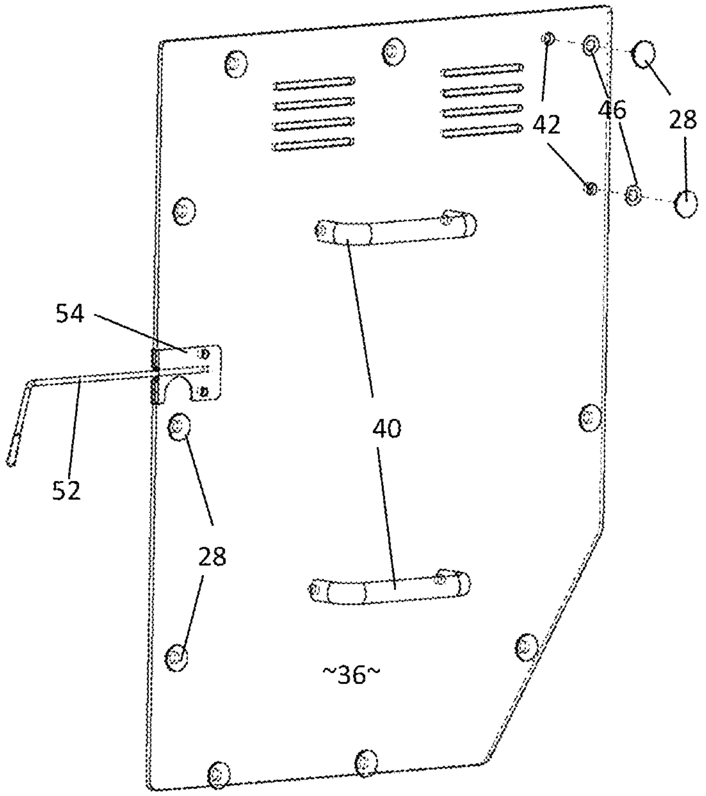
FIG. 8 shows a front view of the panel assembly shown in FIG. 7.
Figure 9:
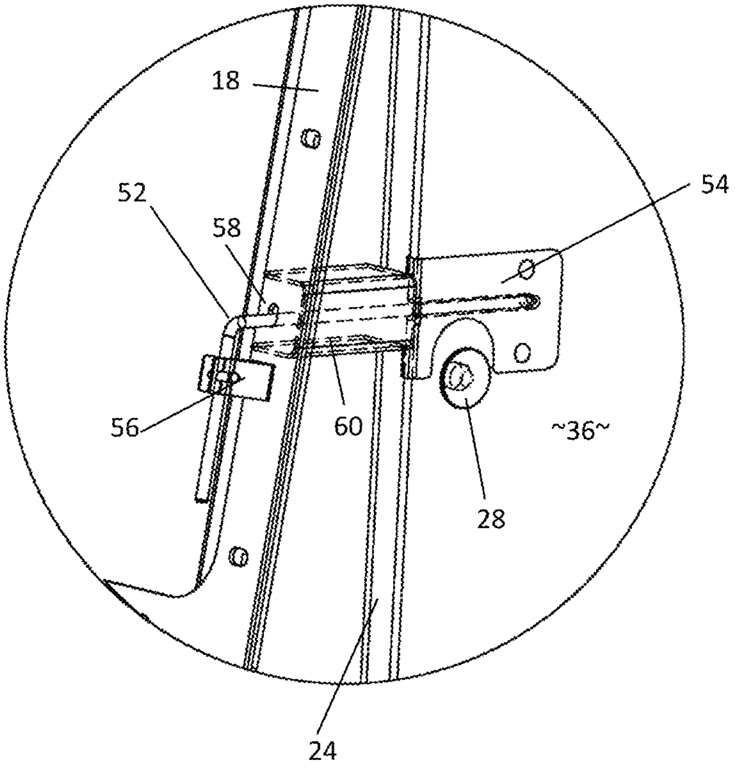
FIG. 9 shows a close-up perspective side view of a portion of the security partition shown in FIG. 4.

Referring to FIGS. 1-9, the panel locking means 38 includes a release pin 52, a release pin cover 54, and the release pin retainer clip 56. The release pin retainer clip 56 is attached to the front partition panel 18. The release pin 52 engages with (1) the front partition release pin interface 58 (e.g., a through hole or the like) of the front partition panel 18; (2) the release partition release pin interface 60 (e.g., a through hole or the like) of the release partition panel 24; and (3) the release pin cover 54 secures the panel 36 in the vertical direction by tying the panel 36 into the partition frame 20 as shown in FIGS. 4 and 9. The release pin retainer clip 56 prevents the release pin 52 from vibrating loose. A thin zip tie (e.g., such as the type used on fire extinguishers and not shown) can be optionally utilized as additional security to prevent the release pin 52 from being accidentally removed. Once engaged as described above and shown in the drawings, the panel locking means 38 prevents the individual located in the secured occupant area 16 from having the ability to remove the release pin 52. Only individuals located in the unsecured occupant area have access to the release pin 52.

Figure 11A:
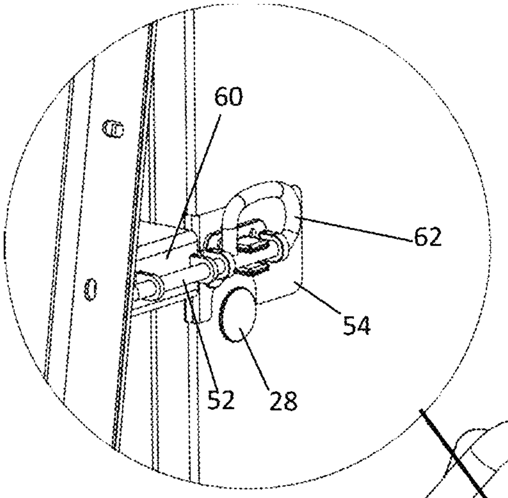
FIG. 11A shows a close-up perspective view of a portion of FIG. 11.
Figure 11:
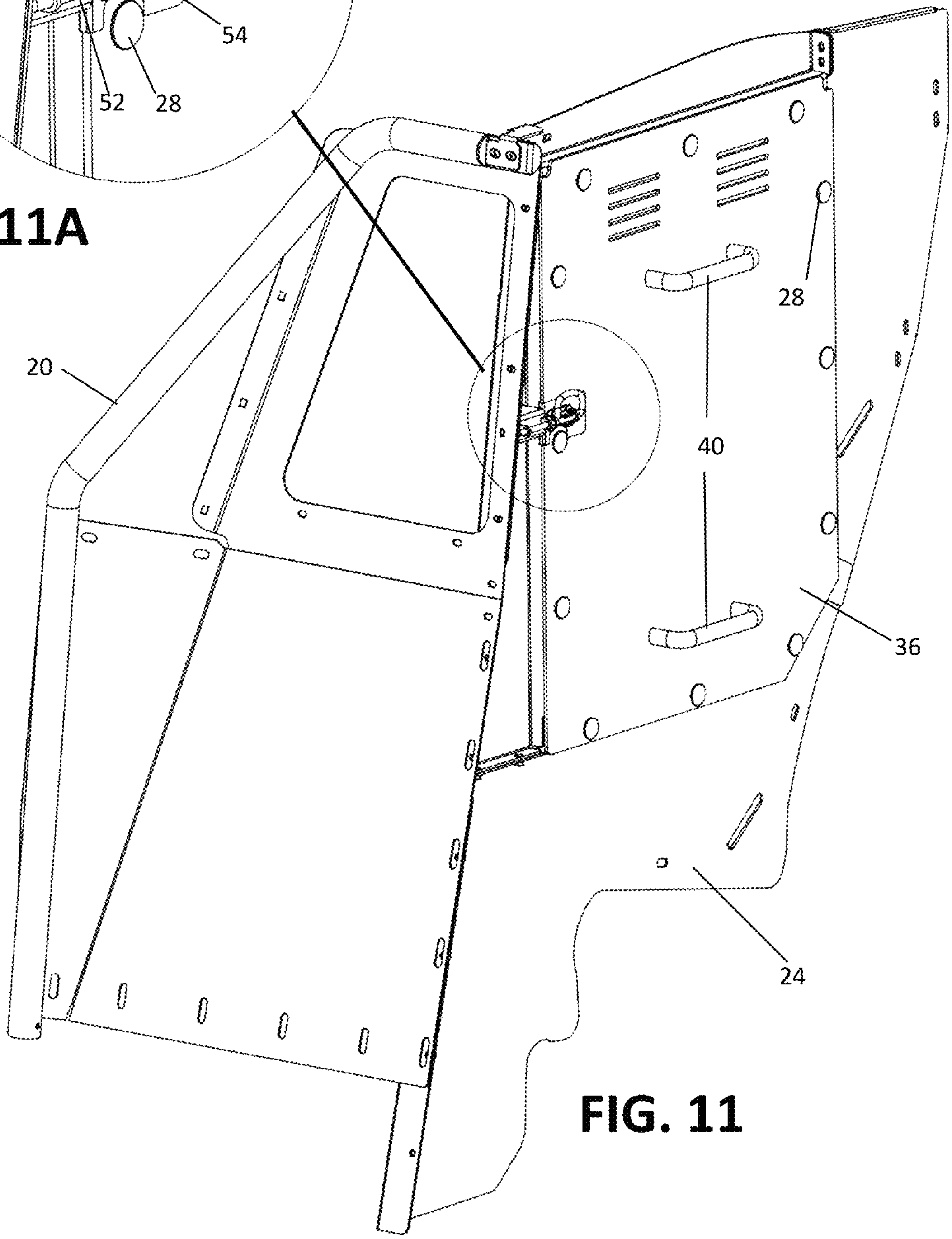
FIG. 11 shows a perspective side view of the portion of the security partition shown in FIG. 4 but with another embodiment of the panel locking means.

In an alternative exemplary embodiment of the panel locking means 38, the release pin 52 includes an art-disclosed bolt latch 62 as shown in FIGS. 11 and 11A to prevent the release pin 52 from vibrating loose. Accordingly, the bolt latch 62 can optionally replace the release pin retainer clip 56.

During emergency conditions, a rescuer may gain access to the individual located in the secured occupant area 16 by activating the panel locking means 38 (e.g., by first pulling out the release pin 52). Thereafter, the rescuer can pull up on the at least one handles 40 attached to the panel 36 causing the panel 36 to shift vertically by a small amount thus aligning the quick release locking means 28 (e.g., locking pins or the like) with the release slot portion 34 of the partition locking interfaces 26. The moment the quick release locking means 28 align with the release slot portion 34 of the partition locking interfaces 26, the pressure imparted by the spring washers/springs/compressors (46, 48, 50) will force all of the quick release locking means 28 out of the partition locking interfaces 26. The panel 36 is now free and may be readily discarded allowing the rescuer to gain access to the individual located in the secured occupant area 16.

Figure 12A:
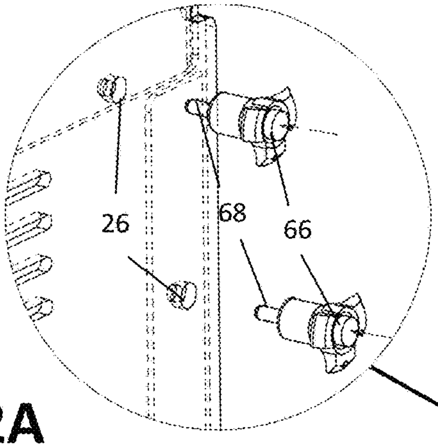
FIG. 12A shows a close-up perspective view of a portion of FIG. 12.
Figure 12:
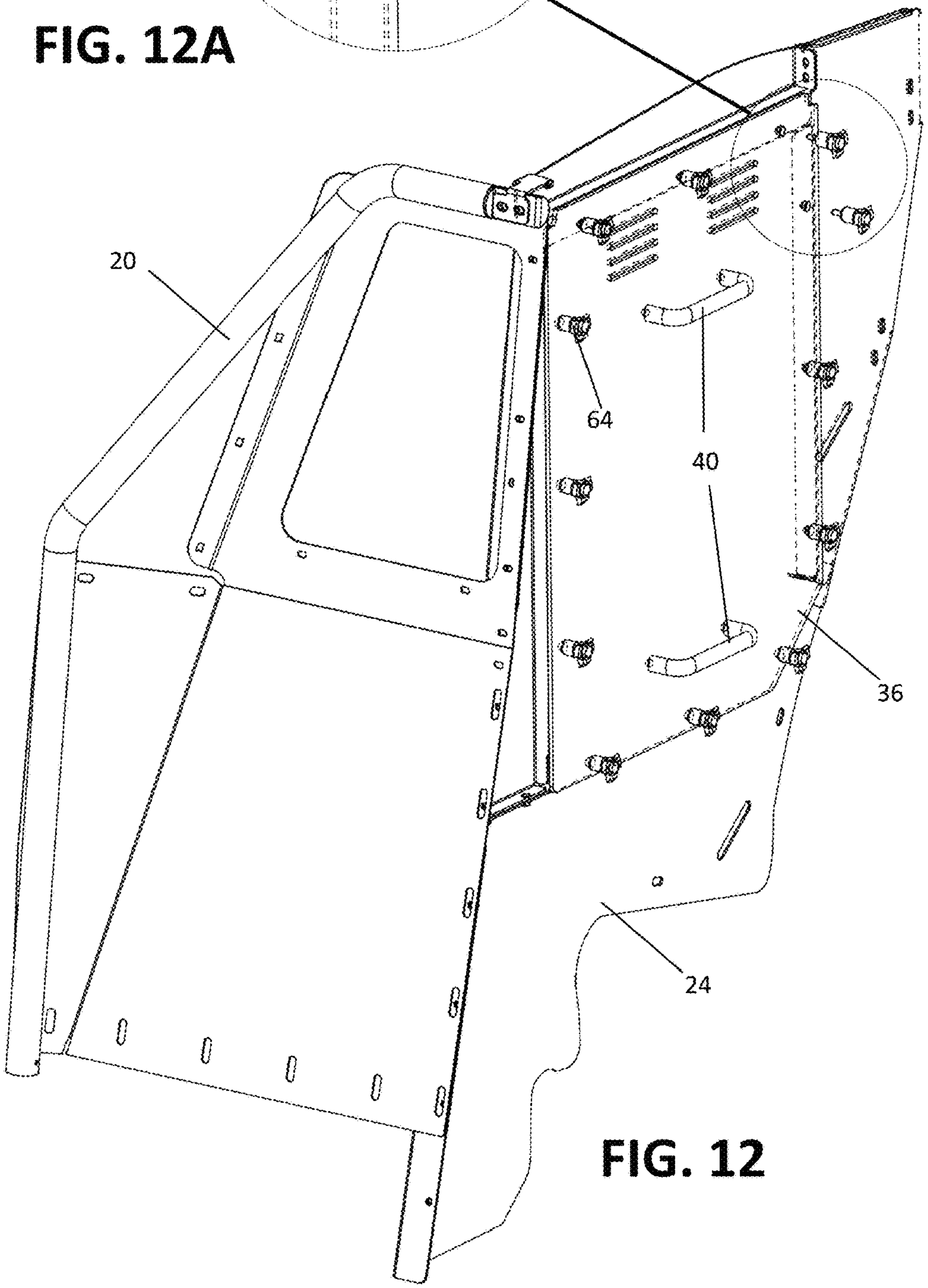
FIG. 12 shows a perspective side view of the portion of the security partition shown in FIG. 11 but with another embodiment of the emergency release system.
Figure 13A:
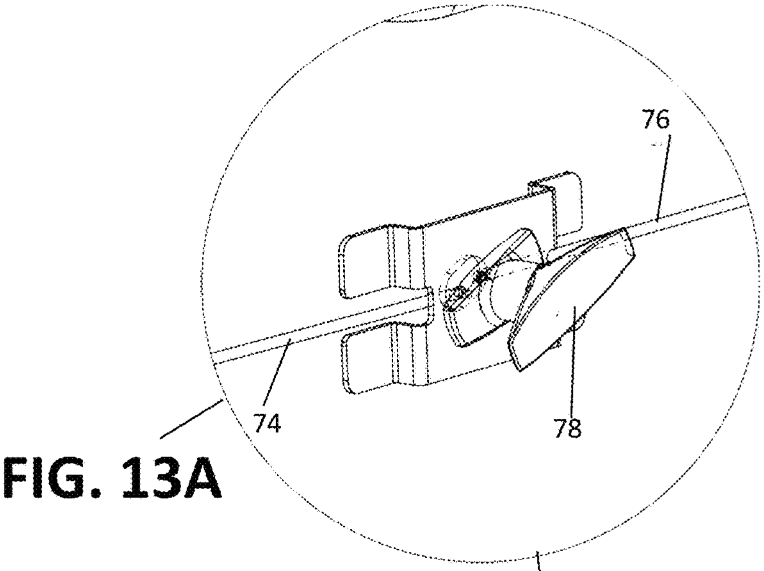
FIG. 13A shows a close-up perspective view of a portion of FIG. 13.
Figure 13:
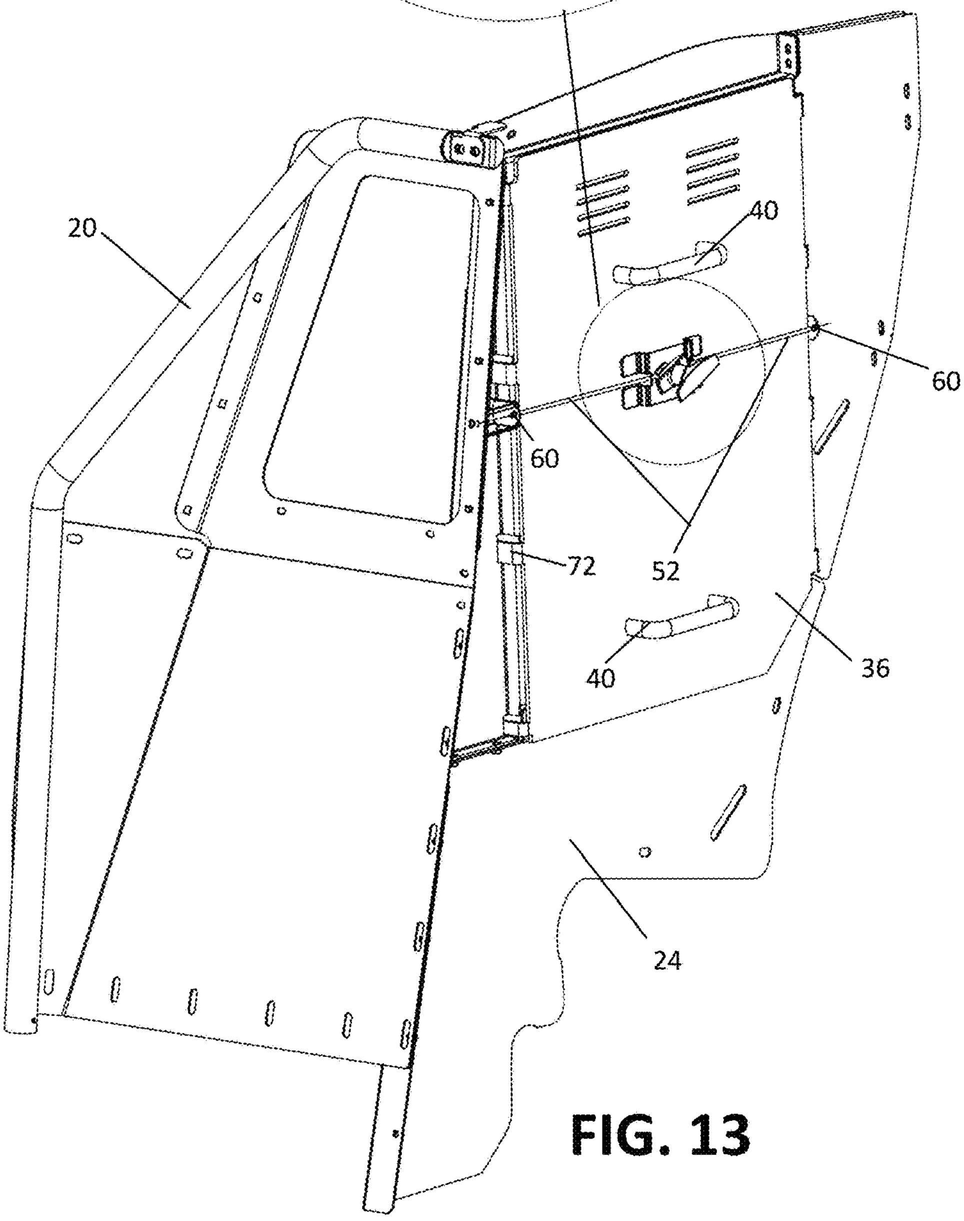
FIG. 13 shows a perspective side view of the portion of the security partition shown in FIG. 12 but with another embodiment of the emergency release system.
Figure 14A:
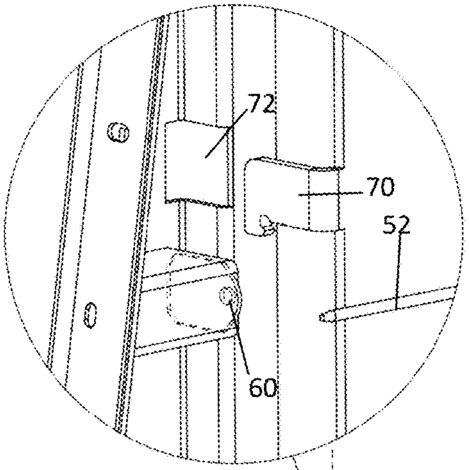
FIG. 14A shows a close-up perspective view of a portion of FIG. 14.
Figure 14:
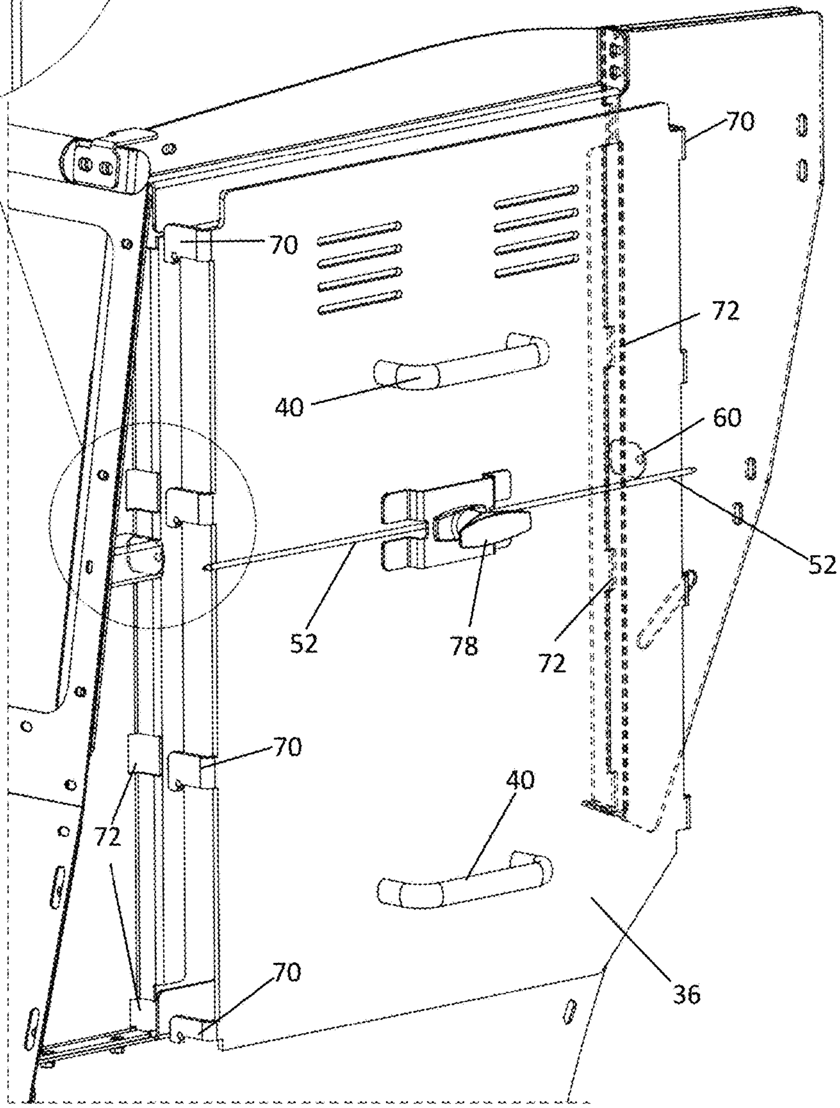
FIG. 14 shows a perspective side view of the emergency release system shown in FIG. 13.
Figure 15A:
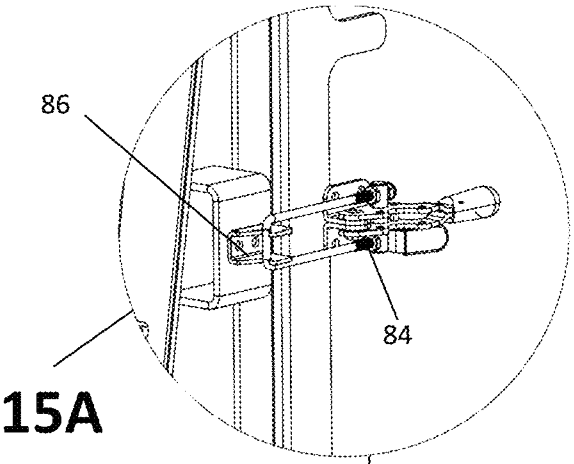
FIG. 15A shows a close-up perspective view of a portion of FIG. 15.
Figure 15:
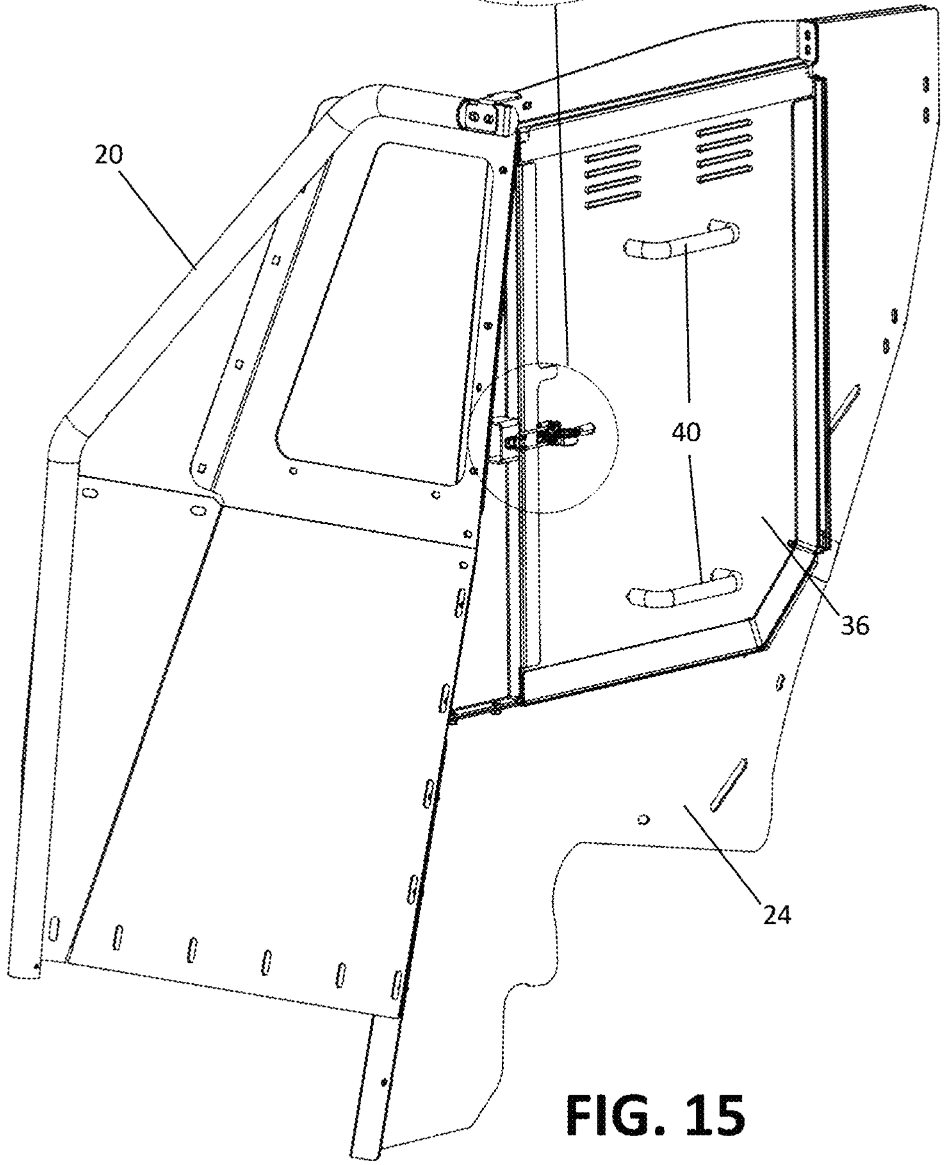
FIG. 15 shows a perspective side view of the portion of the security partition shown in FIG. 13 but with another embodiment of the emergency release system.

Referring to FIGS. 12 and 12A, in another exemplary embodiment of the system 100, the quick release locking means 28 is an art-disclosed quick release pin 64, also known as a ball lock pin. See e.g., https://www.mcmaster.com/93042A540/. The quick release pin 64 includes a push button 66 to lock and unlock the locking ball(s) 68 contained within the quick release pin 64. The partition locking interfaces 26 are designed to accept the quick release pin 64 and engage with the locking ball(s) 68 when locked.

Referring to FIGS. 13, 13A, 14, and 14A, in yet another exemplary embodiment of the system 100, the quick release locking means 28 are slot hooks 70 and the partition locking interfaces 26 are hook slots 72. The slot hooks 70 are securely engaged with the hook slots 72 when the slot hooks 70 are inserted into the hook slots 72 and then lowered into a locking position. To disengage the slot hooks 70 from the hook slots 72, an user can grab the handles 40, push upward, and then pull out to release the slot hooks 70 from the hook slots 72.

In this exemplary embodiment and referring to FIGS. 13, 13A, 14, and 14A, the panel locking means 38 includes the release pin 52 having a first pin portion 74 and a second pin portion 76. Both the first pin portion 74 and the second pin portion 76 are attached to an art-disclosed latch handle 78 that controls the release pin 52. When the latch handle 78 is in a locked position, the release pin 52 extends across the entire panel 36 and engages with the release partition release pin interfaces 60 located near each side of the panel 36. When the latch handle 78 is rotated by an user, it (78) reduces the physical distance between the first pin portion 74 and the second pin portion 76 of the release pin 52, thereby causing the entire release pin 52 to disengage from the release partition release pin interfaces 60.

Figures 16, 16A, 16B, 16C, 16D:
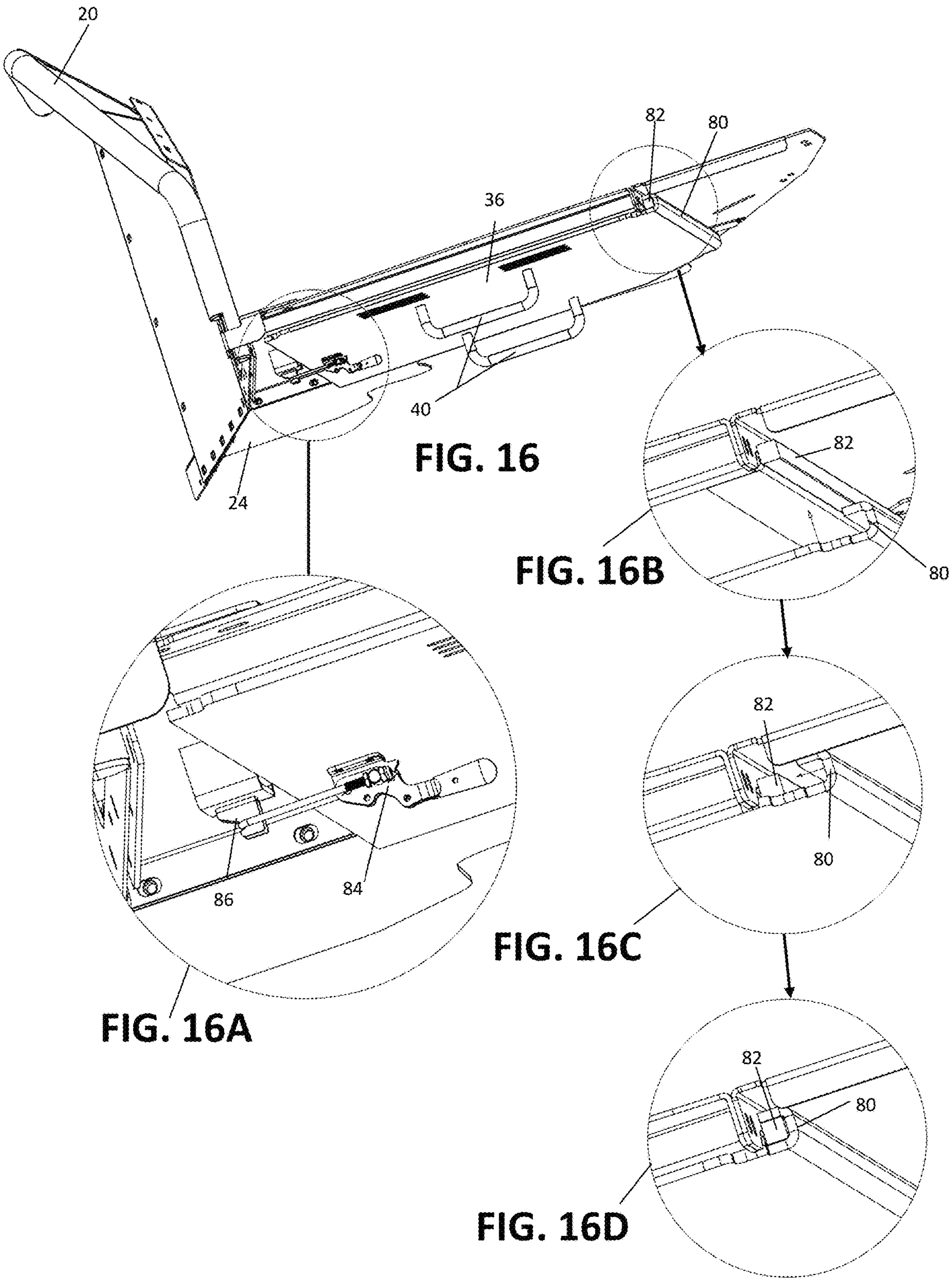
FIG. 16 shows a top perspective view of the portion of the security partition shown in FIG. 15.
FIG. 16A shows a close-up perspective view of a portion of FIG. 15.
FIG. 16B-C each shows a close-up perspective view of a portion of FIG. 15 when the panel slot feature is disengaged from the slot member.
FIG. 16D shows a close-up perspective view of a portion of FIG. 15 with the panel slot feature engaged with the slot member.
Figure 17A:
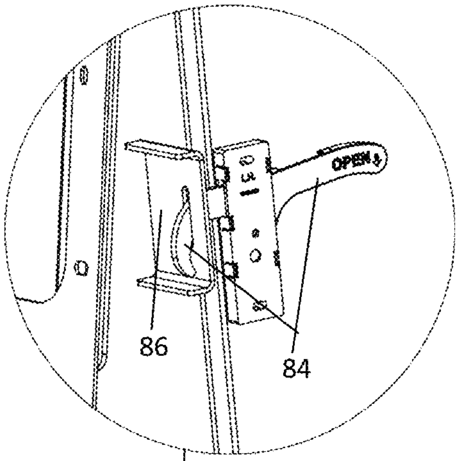
FIG. 17A shows a close-up perspective view of a portion of FIG. 17.
Figure 17:
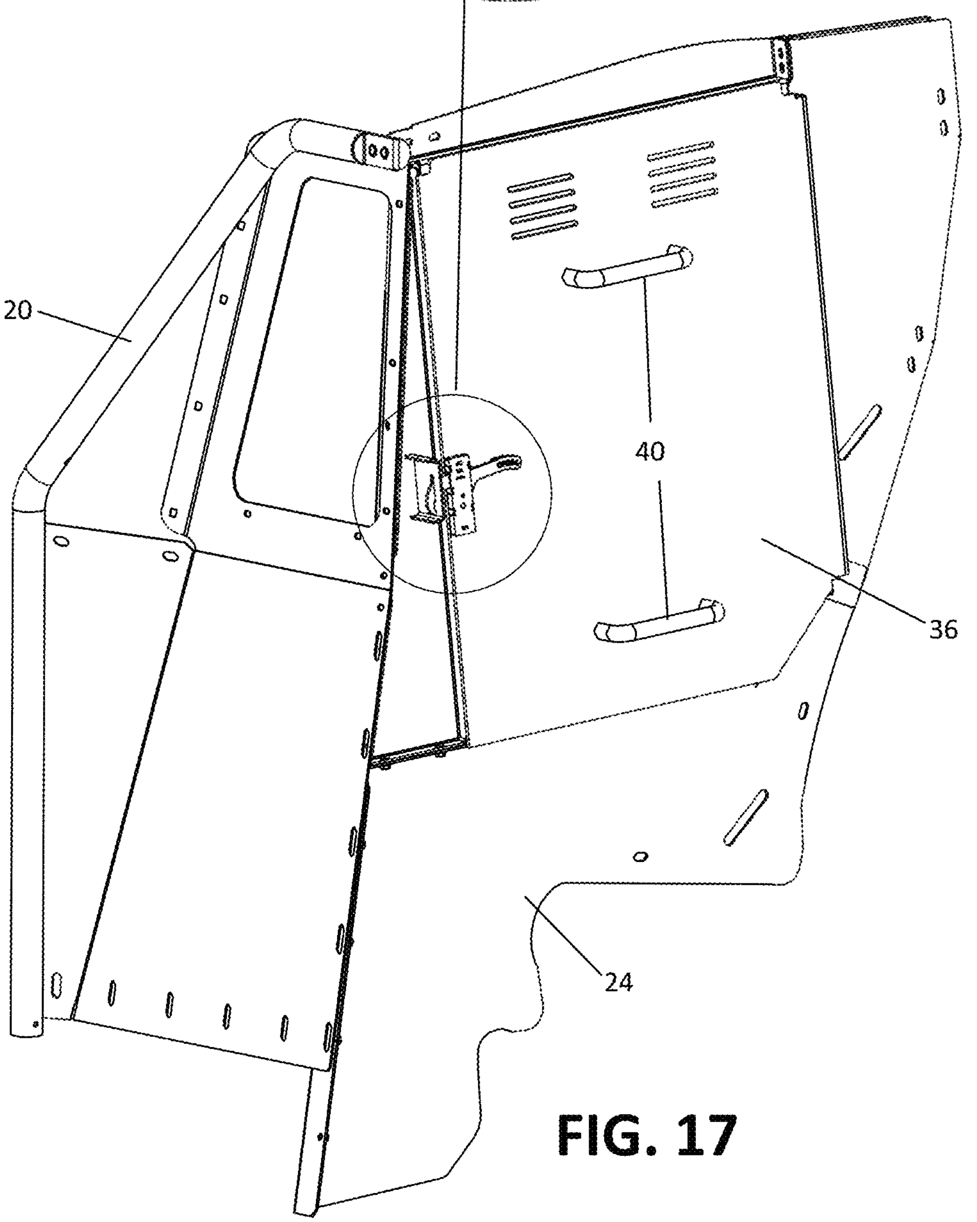
FIG. 17 shows a perspective side view of the portion of the security partition shown in FIG. 15 but with another embodiment of the emergency release system.

Referring to FIGS. 15, 15A, 16, 16A-D, 17, and 17A which show another exemplary embodiment of the system 100 wherein the quick release locking means 28 is a panel slot feature 80 (e.g., an U channel) of the panel 36 and the partition locking interface 26 is a slot member 82 of the release partition panel 24. To securely attach the panel 36 to the release partition panel 24, the panel slot feature 80 is coupled/engaged with the slot member 82 as shown in FIGS. 16B-D. The panel locking means 38 of this embodiment includes a conventional latch mechanism 84 attached to the panel 36. The latch mechanism 84 is designed to engage with a corresponding latch retaining feature 86 attached to the release partition panel 24. The present I invention includes any suitable art-disclosed latch mechanism 84 and its corresponding latch retaining feature 86 such as the latch mechanism 84 that operates horizontally as shown in FIGS. 15, 15A, 16, 16A-D, and the latch mechanism 84 that operates vertically as shown in FIGS. 17 and 17A.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

What is claimed is:

1. A security partition having a quick release emergency release system for a vehicle comprising:

a security partition frame;

a front partition panel;

a release partition panel having one or more partition locking interfaces;

an emergency panel system having a panel, at least one handle, and one or more quick release locking means; wherein the front partition panel and the release partition panel are attached to the security partition frame thereby separating interior of the vehicle into a secured occupant area and an unsecured occupant area;

in a normal condition, defined as when an emergency escape is not desired for an occupant located within the secured occupant area, the panel is securely attached to the release partition panel via engagement by the quick release locking means with the partition locking interfaces’ in an emergency condition, defined as when the emergency escape is desired for the occupant located in the secured occupant area, the quick release locking means are activated to quickly disengage the panel from the release partition to provide an emergency exit for the secured occupant area of the vehicle;

the quick release locking means further includes anti-rattle means;

the quick release locking means are locking pins having hourglass shape;

the partition locking interfaces are keyhole slots each having a release slot portion and a secured slot portion; and the engagement by the quick release locking means with the partition locking interfaces is achieved by having a portion of each of the locking pins enters through the panel locking means into the secured slot portion of the partition locking interface.

2. The security partition of claim 1 wherein the anti-rattle means is a spring washer.

3. The security partition of claim 1 wherein the anti-rattle means is a spring.

4. The security partition of claim 1 wherein the anti-rattle means is a compressor.

5. A security partition having a quick release emergency release system for a vehicle comprising:

a security partition frame;

a front partition panel;

a release partition panel having one or more partition locking interfaces;

an emergency panel system having a panel, at least one handle, and one or more quick release locking means; wherein the front partition panel and the release partition panel are attached to the security partition frame thereby separating interior of the vehicle into a secured occupant area and an unsecured occupant area;

in a normal condition, defined as when an emergency escape is not desired for an occupant located within the secured occupant area, the panel is securely attached to the release partition panel via engagement by the quick release locking means with the partition locking interfaces;

in an emergency condition, defined as when the emergency escape is desired for the occupant located in the secured occupant area, the quick release locking means are activated to quickly disengage the panel from the release partition to provide an emergency exit for the secured occupant area of the vehicle;

the release partition panel further includes one or more release partition release pin interfaces;

the panel's secured attachment to the release partition panel further includes engagement by the panel locking means with the one or more of the release partition release pin interfaces;

in the emergency condition, the panel locking means also are activated to quickly disengage the panel from the release partition to provide an emergency exit for the secured occupant area of the vehicle;

the quick release locking means are slot hooks the partition locking interfaces are hook slots;

the panel locking means includes a latch handle attached to the panel and a release pin that having a first pin portion and a second pin portion; and both the first pin portion and the second pin portion are attached to the latch handle and controlled by the latch handle for engagement with the release partition release pin interfaces during the normal condition and for disengagement with the release partition release pin interfaces during the emergency condition.

6. A security partition having a quick release emergency release system for a vehicle comprising:

a security partition frame;

a front partition panel;

a release partition panel having a release partition pin interface and quick release locking means;

an emergency panel system having a panel, at least one handle, panel locking means, and partition locking interfaces; wherein the front partition panel and the release partition panel are attached to the security partition frame thereby separating interior of the vehicle into a secured occupant area and an unsecured occupant area;

in a normal condition, defined as when an emergency escape is not desired for an occupant located within the secured occupant area, the panel is securely attached to the release partition panel via (a) engagement by the panel locking means with the release partition release pin interface, and (b) engagement by the quick release locking means with the partition locking interfaces;

in an emergency condition, defined as when the emergency escape is desired for the occupant located in the secured occupant area, the panel locking means and the quick release locking means are activated to quickly disengage the panel from the release partition to provide an emergency exit for the secured occupant area of the vehicle;

the quick release locking means are locking pins having hourglass shape;

the partition locking interfaces are keyhole slots each having a release slot portion and a secured slot portion;

the engagement by the quick release locking means with the panel locking means and the partition locking interfaces is achieved by having a portion of each of the locking pins enters through the panel locking means into the secured slot portion of the partition locking interface.

7. A quick release emergency release system, for a vehicle having a security partition that separates interior of the vehicle into a secured occupant area and an unsecured occupant area, comprising:

a release partition panel of the security partition having one or more partition locking interfaces;

an emergency panel system having a panel, at least one handle, and quick release locking means; wherein in a normal condition, defined as when an emergency escape is not desired for an occupant located within the secured occupant area, the panel is securely attached to the release partition panel via engagement by the quick release locking means with the partition locking interfaces;

in an emergency condition, defined as when the emergency escape is desired for the occupant located in the secured occupant area, the quick release locking means are activated to quickly disengage the panel from the release partition to provide an emergency exit for the secured occupant area of the vehicle;

the quick release locking means further includes anti-rattle means;

the quick release locking means are locking pins having hourglass shape;

the partition locking interfaces are keyhole slots each having a release slot portion and a secured slot portion; and the engagement by the quick release locking means with the partition locking interfaces is achieved by having a portion of each of the locking pins enters through the panel locking means into the secured slot portion of the partition locking interface.

8. The quick release emergency release system of claim 7 further includes panel locking means, wherein the release partition plan further includes a release partition pin interface;

in the normal condition, the panel's secured attachment to the release partition panel further includes engagement by the panel locking means with one or more of the release partition release pin interfaces; and in the emergency condition, the panel locking means also are activated to quickly disengage the panel from the release partition to provide an emergency exit for the secured occupant area of the vehicle.

9. A quick release emergency release system, for a vehicle having a security partition that separates interior of the vehicle into a secured occupant area and an unsecured occupant area, comprising:

a release partition panel of the security partition having one or more partition locking interfaces;

an emergency panel system having a panel, at least one handle, and quick release locking means; wherein in a normal condition, defined as when an emergency escape is not desired for an occupant located within the secured occupant area, the panel is securely attached to the release partition panel via engagement by the quick release locking means with the partition locking interfaces;

in an emergency condition, defined as when an emergency escape is desired for the occupant located in the secured occupant area, the quick release locking means are activated to quickly disengage the panel from the release partition to provide an emergency exit for the secured occupant area of the vehicle;

panel locking means, wherein the quick release locking means are slot hooks the partition locking interfaces are hook slots;

the panel locking means includes a latch handle attached to the panel and a release pin that having a first pin portion and a second pin portion;

both the first pin portion and the second pin portion are attached to the latch handle and controlled by the latch handle for engagement with the release partition release pin interfaces during the normal condition and for disengagement with the release partition release pin interfaces during the emergency condition.

* * * * *